Nov. 28, 1933.　　　　D. E. GAMBLE　　　　1,937,112
BEARING FOR CLUTCH RELEASES
Filed May 9, 1931
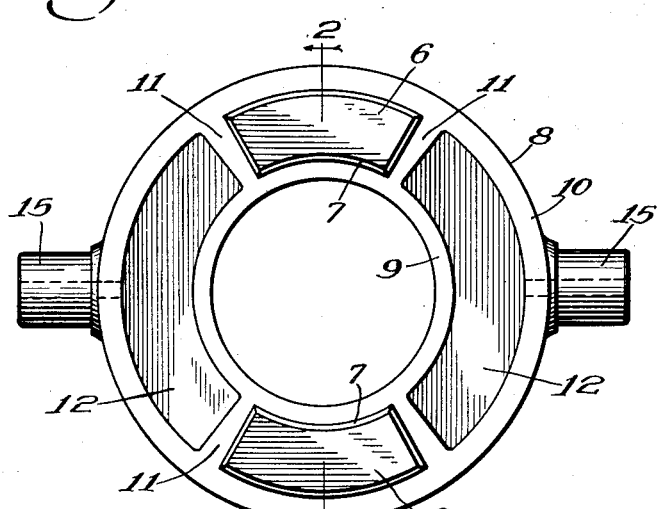
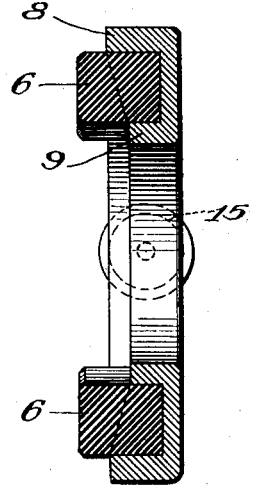
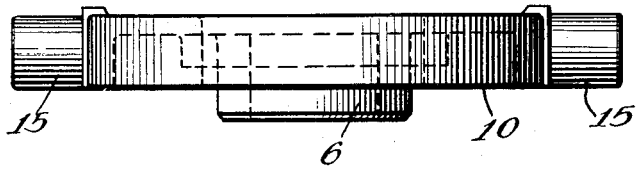
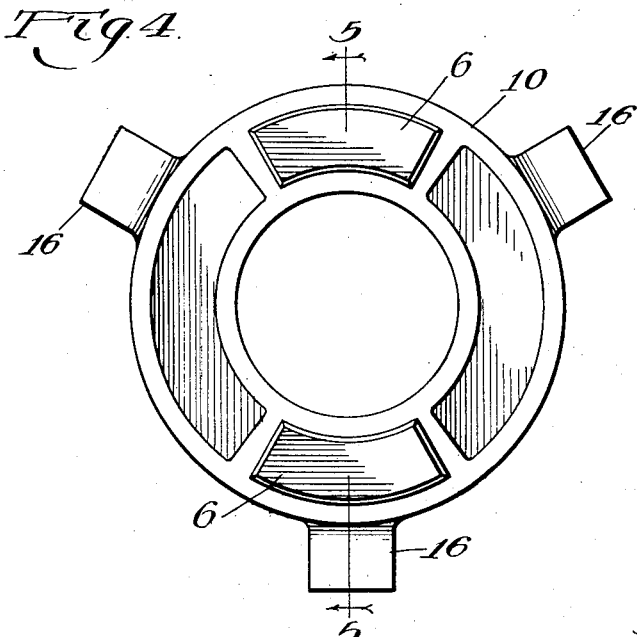
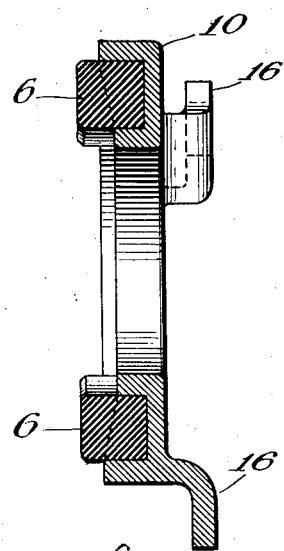
Inventor:
David E. Gamble, Patented Nov. 28, 1933

1,937,112

UNITED STATES PATENT OFFICE 1,937,112

BEARING FOR CLUTCH RELEASES

David E. Gamble, Chicago, Ill., assignor to The Borg & Beck Company, Chicago, Ill., a corporation of Illinois Application May 9, 1931. Serial No. 536,290

3 Claims. (Cl. 192—98)

This is a continuation in part of my application Serial No. 109,238, filed May 15, 1926, Patent No. 1,808,980, patented June 9, 1931.

The object of the invention is to provide a novel and improved bearing for the release yoke of an automatic clutch.

A further object of the invention is to improve the manufacture of clutch release yoke bearings and reduce the cost thereof by casting the bearing cup upon the anti-friction material whereby the anti-friction material is securely held in the cup and the necessity for machining the cup and otherwise providing for a neat fit of the anti-friction material in the cup are avoided.

The invention has other objects in view which will appear hereafter in the detail description, reference being had to the accompanying drawing in which Fig. 1 is a plan view of a bearing embodying the invention;

Fig. 2 is a sectional view on the line 2—2 of Fig. 1;

Fig. 3 is an elevation of the bearing shown in Fig. 1;

Fig. 4 is a plan view showing another type of bearing; and

Fig. 5 is a sectional view on the line 5—5 of Fig. 4.

Referring to the drawing 6, 6 are blocks of anti-friction material which are conveniently disposed diametrically opposite and are seated in pockets 7, 7 in the cup 8. The cup has inner and outer concentric flanges 9 and 10 forming an annular channel therebetween. Transverse partitions 11, preferably disposed radially of the bearing, are arranged in the channel and connect the flanges to form pockets for receiving the blocks of anti-friction material, the ends of the blocks abutting the partitions 11 which form end stops to resist tendency of the blocks to move endwise in the cup under the influence of the clutch release sleeve, not shown, with which the bearing engages. The blocks protrude sufficiently beyond the cup to engage the clutch release sleeve without the cup contacting with the sleeve. The pockets may all be of the same length or they may vary in length. I have shown the two opposite pockets 7, 7 of equal length and the pockets 12, 12 also of equal length but of greater length than the pockets 7, 7, this being merely illustrative of the manner in which pockets may be made. The pockets 7, 7 are shown supplied with anti-friction blocks 6, 6 and the pockets 12, 12 are empty but the pockets 12, 12 may be supplied with blocks and the pockets 7, 7 may be empty or all pockets may be supplied with blocks.

The bearing may be provided with trunnions 15 as shown in Figs. 1-3 or with fingers 16 radially projecting from the cup at the bottom thereof.

In the manufacture of the bearing, the blocks are made first in a desired shape and then the cup is cast on the blocks. This is a simple and economical method of manufacture and it presents other advantages which are important in the art. By casting the cup on the blocks I save the time and labor in machine work which would have to be performed on the cup to receive the blocks; I also reduce the number of parts of the bearing and lessen the cost of manufacture. Furthermore, by casting the cup on the blocks I provide neat fits for the blocks in the cup and this is accomplished without the necessity of any machine work; and this cast fit of the cup on the blocks holds the parts together securely.

I have shown the invention embodied in simple forms in the drawing but I appreciate that changes in the form, construction and arrangement of parts may be made without departing from the spirit and sacrificing the advantages of the invention and I reserve the right to make all such changes as fall within the scope of the following claims.

I claim:

1. A clutch release yoke bearing having spaced anti-friction bearings therein arranged diametrically opposite to each other, and a channel shaped cup cast on said blocks and having spaced transverse partitions in the channel, each of said partitions engaging an end of one of the blocks to resist the tendency of the block to move endwise in the channel, said spaced blocks having the faces thereof protruding beyond the face of the cup.

2. A clutch release yoke bearing comprising a cup having inner and outer concentric flanges forming an annular channel therebetween, transverse partitions arranged in pairs and disposed radially of the bearing and in the channel to connect the flanges and form substantially diametrically opposite pockets spaced from each other, and blocks of anti-friction material in said pockets and having the faces thereof protruding beyond the face of the cup.

3. A clutch release yoke bearing comprising a cup having inner and outer concentric flanges forming an annular channel therebetween, the outer flange being of a greater height than the inner flange, said inner flange surrounding a shaft embracing opening at the center of the bearing, transverse partitions arranged in pairs and disposed radially of the bearing and in the channel to connect the flanges and form a pair of spaced pockets, and blocks of anti-friction material in said pockets and having the faces thereof protruding beyond the face of the cup and having the ends thereof abutted with said partitions to resist the tendency of the blocks to move endwise in the pockets.

DAVID E. GAMBLE.